United States Patent
Robinson et al.

(10) Patent No.: US 9,810,773 B2
(45) Date of Patent: Nov. 7, 2017

(54) MITIGATION OF ANOMALOUS PROPAGATION EFFECTS IN RADAR

(71) Applicant: BAE SYSTEMS plc, London (GB)

(72) Inventors: Bryan Robinson, Hampshire (GB); Noel Turner, Hampshire (GB); Philip Trevelyan Edwards, Hampshire (GB)

(73) Assignee: BAE SYSTEMS plc, London (GB)

( * ) Notice: Subject to any disclaimer, the term of this patent is extended or adjusted under 35 U.S.C. 154(b) by 207 days.

(21) Appl. No.: 14/651,940

(22) PCT Filed: Dec. 12, 2013

(86) PCT No.: PCT/GB2013/053263
§ 371 (c)(1),
(2) Date: Jun. 12, 2015

(87) PCT Pub. No.: WO2014/091230
PCT Pub. Date: Jun. 19, 2014

(65) Prior Publication Data
US 2015/0316642 A1 Nov. 5, 2015

(30) Foreign Application Priority Data

Dec. 14, 2012 (EP) ..................................... 12275205
Dec. 14, 2012 (GB) ................................... 1222606.4

(51) Int. Cl.
*G01S 7/292* (2006.01)
*G01S 7/41* (2006.01)
(Continued)

(52) U.S. Cl.
CPC ............ *G01S 7/292* (2013.01); *G01S 7/2921* (2013.01); *G01S 7/414* (2013.01);
(Continued)

(58) Field of Classification Search
CPC ...... G01S 7/292; G01S 7/2921; G01S 7/2923; G01S 7/2927; G01S 7/414; G01S 13/5244
(Continued)

(56) References Cited

U.S. PATENT DOCUMENTS 4,214,242 A * 7/1980 Colin ...................... G01S 13/64
342/137
4,489,320 A * 12/1984 Lewis ................... G01S 7/2928
342/160
(Continued)

FOREIGN PATENT DOCUMENTS

EP 0126032 A2 11/1984
GB 1490751 11/1977
(Continued)

OTHER PUBLICATIONS

International Preliminary Report on Patentability and Written Opinion received for Patent Application No. PCT/GB2013/053263, dated Jun. 25, 2015. 9 pages.
(Continued)

*Primary Examiner* — Peter Bythrow
(74) *Attorney, Agent, or Firm* — Finch & Maloney PLLC

(57) ABSTRACT

Disclosed is a method of mitigating the effects of anomalous propagation in a Radar system, comprising the steps of: receiving a plurality of returns from a plurality of transmit pulses; calculating a difference in magnitude between each of the plurality of returns and its successor; if one of the calculated differences indicates a first step change greater than a first predetermined threshold, calculating a first average magnitude of the returns received after the first step change, and replacing the returns received before the first step change with synthesised returns having a magnitude equal to the first calculated average magnitude.

12 Claims, 9 Drawing Sheets

(51) Int. Cl.
*G01S 13/02* (2006.01)
*G01S 13/524* (2006.01)

(52) U.S. Cl.
CPC ....... *G01S 13/0218* (2013.01); *G01S 13/5244* (2013.01); *G01S 2013/0227* (2013.01)

(58) Field of Classification Search
USPC ........................................................ 342/159
See application file for complete search history.

(56) References Cited

U.S. PATENT DOCUMENTS

| | | | | |
|---|---|---|---|---|
| 4,630,052 | A * | 12/1986 | Galati | G01S 13/528 |
| | | | | 342/159 |
| 4,714,927 | A | 12/1987 | Siegel et al. | |
| 4,845,500 | A * | 7/1989 | Cornett | G01S 13/72 |
| | | | | 342/139 |
| 4,970,660 | A * | 11/1990 | Marchant | G06K 9/3241 |
| | | | | 342/90 |
| 4,973,968 | A * | 11/1990 | Hurd | G01S 13/20 |
| | | | | 342/137 |
| 5,952,955 | A | 9/1999 | Kennedy et al. | |
| 6,771,209 | B1 | 8/2004 | Long | |
| 7,463,181 | B2 * | 12/2008 | Wintermantel | G01S 7/023 |
| | | | | 342/104 |
| 7,741,992 | B2 | 6/2010 | Wang et al. | |
| 8,405,544 | B2 * | 3/2013 | Nakagawa | G01S 7/023 |
| | | | | 342/146 |
| 8,665,132 | B2 * | 3/2014 | Ranney | G01S 7/414 |
| | | | | 342/179 |
| 9,223,015 | B2 * | 12/2015 | Kojima | G01S 13/10 |
| 2006/0036353 | A1 * | 2/2006 | Wintermantel | G01S 7/023 |
| | | | | 700/300 |
| 2010/0228512 | A1 * | 9/2010 | Rowe | G01D 1/00 |
| | | | | 702/85 |
| 2011/0273963 | A1 * | 11/2011 | Onishi | G01S 7/2927 |
| | | | | 367/93 |
| 2011/0298651 | A1 * | 12/2011 | Nakagawa | G01S 7/023 |
| | | | | 342/146 |
| 2012/0127023 | A1 * | 5/2012 | Nakagawa | G01S 7/16 |
| | | | | 342/146 |
| 2012/0154204 | A1 * | 6/2012 | Wood | G01S 7/414 |
| | | | | 342/159 |
| 2012/0154208 | A1 * | 6/2012 | Wood | G01S 7/414 |
| | | | | 342/205 |
| 2015/0338513 | A1 * | 11/2015 | Moon | G01S 13/931 |
| | | | | 342/27 |

FOREIGN PATENT DOCUMENTS

| | | |
|---|---|---|
| JP | 2007240317 A | 9/2007 |
| WO | 2014091230 A1 | 6/2014 |

OTHER PUBLICATIONS

International Search Report received for Patent Application No. PCT/GB2013/053263, dated Feb. 19, 2014. 4 pages.
GB Intellectual Property Office Search Report under Section 17(5) received for GB Patent Application No. 1222606.4, dated Jun. 13, 2013. 3 pages.
Extended European Search Report received for EP Patent Application No. 12275205.8, dated May 14, 2013. 7 pages.

* cited by examiner

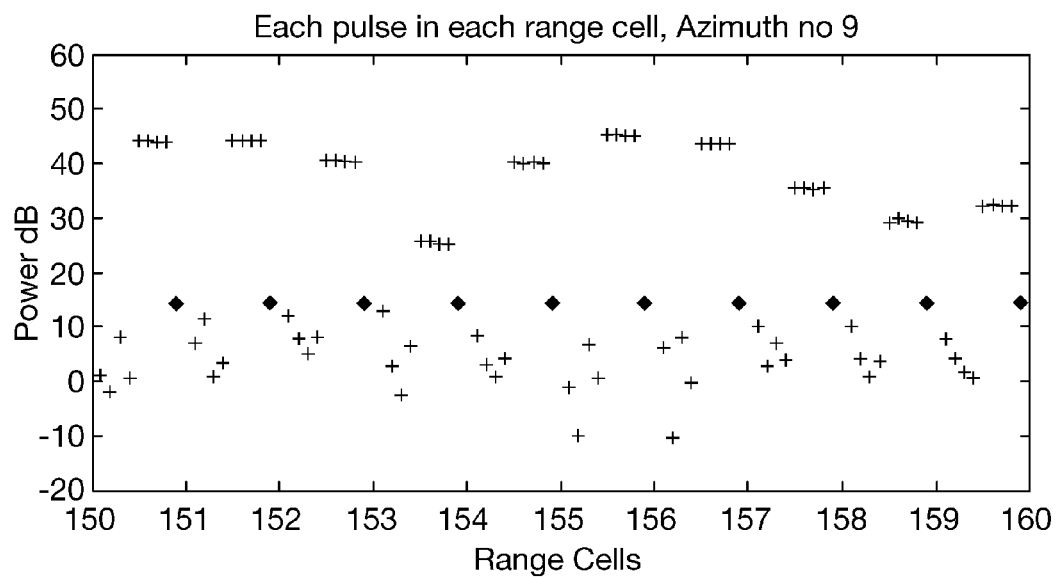
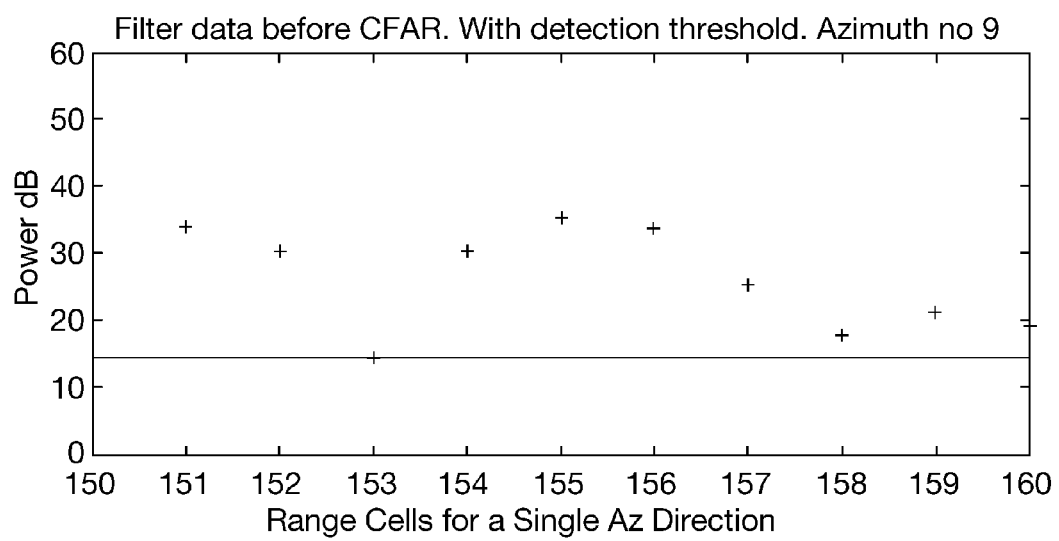

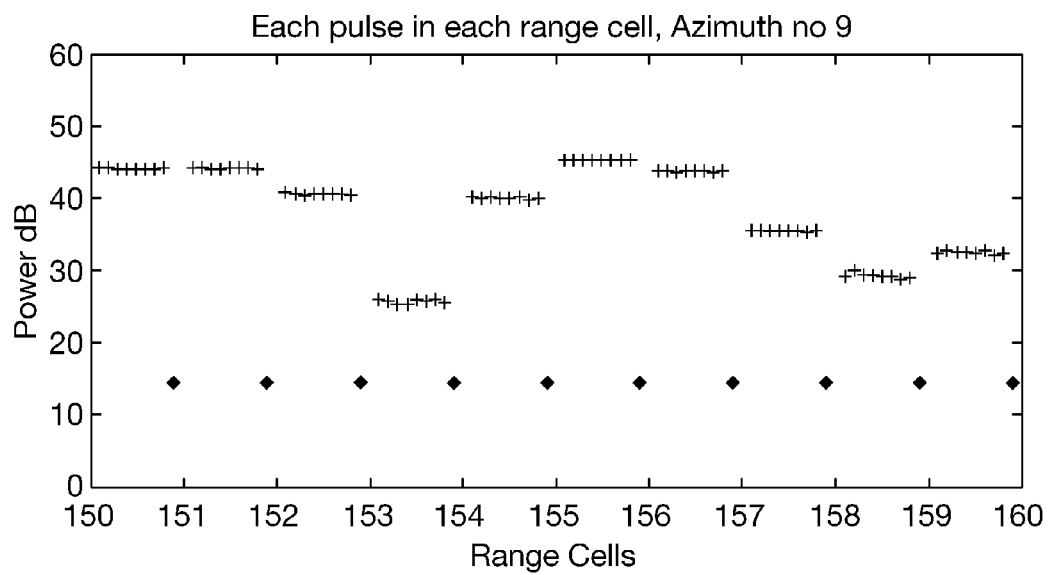
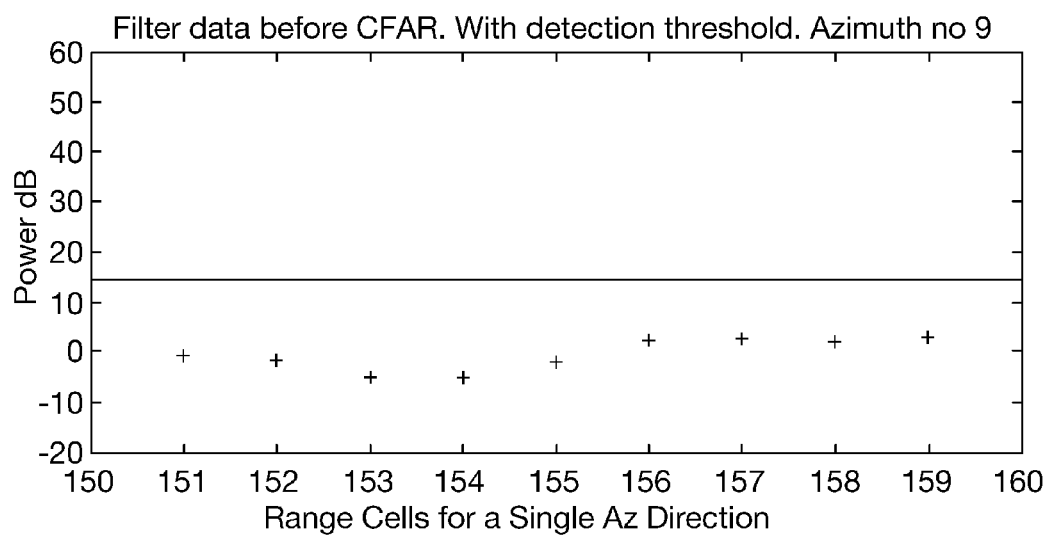

Magnitude of each pulse (dB). Before applying algorithm.
Az no 9, cell no 151

Phase of each pulse. Before applying algorithm.
Az no 9, cell no 151

Magnitude of each pulse (dB). After applying algorithm. Az no 9, cell no 151

Phase of each pulse. After applying algorithm. Az no 9, cell no 151

Magnitude of each pulse (dB). Before applying algorithm.
Az no 6, cell no 102

Phase of each pulse. Before applying algorithm.
Az no 6, cell no 102

Magnitude of each pulse (dB). After applying algorithm.
Az no 6, cell no 102

Phase of each pulse. After applying algorithm.
Az no 6, cell no 102

MITIGATION OF ANOMALOUS PROPAGATION EFFECTS IN RADAR

FIELD

The present invention relates to the field of radars. Specifically, the present invention relates to the mitigation of anomalous propagation effects in radars.

BACKGROUND TO THE PRESENT INVENTION

Anomalous propagation effects can cause a large number of unwanted returns in radar systems subject to certain environmental conditions.

For the purposes of this application, the term anomalous propagation covers the different electromagnetic wave propagations not encountered in a standard atmosphere that refer to cases when a signal propagates below the normal radio horizon.

For example, when a radar system 1 is located in a hot and humid environment, this environmental condition causes radar pulses to be transmitted over very long distances and below the horizon. These pulses then reflect from objects located far from the radar system, over the horizon, such as oil rigs or mountain ranges which were never anticipated to be part of the radar return.

In typical atmospheric conditions, one can normally assume that an electromagnetic wave 2 moves through the troposphere in air that decreases in temperature in a predictable way as height increases as illustrated in FIG. 1. If this is not the case, then the electromagnetic wave will follow a different path, which can lead to super-refraction or sub-refraction.

In certain situations, it can be the case that a layer of air can be cooler than the air above it, breaking the above assumptions for typical atmospheric condition. This situation is sometimes termed a "temperature inversion", and an example of this situation is where a first layer of air near the ground starts cooling at night while another layer of air remains warm away from the ground and above the first layer.

When such a "temperature inversion" occurs, the refractive index of the air increases and an electromagnetic wave passing through the affected area is subject to anomalous propagation where the wave path bends towards the Earth's surface rather than continuing up into the troposphere as illustrated in FIG. 2.

Where the "temperature inversion" is located at the surface of the Earth, the electromagnetic beam will eventually hit the surface and a portion will reflect and be received by the radar system and the remainder will continue in the forward direction, be refracted downwards again, and hit the earth's surface again at a longer range. This may continue many times. Alternatively, where the "temperature inversion" is away from the Earth's surface, for instance in a zone where a cooler and a warmer mass of air collide, the electromagnetic beam can have its path bent within the layer of air such that it extends the distance the beam travels, possibly beyond the expected transmission distance.

The extreme of this situation is when the "temperature inversion" is very strong and shallow, such that the electromagnetic beam is trapped within the "temperature inversion" layer and the beam stays within the layer as it would behave in a waveguide. This is usually termed "ducting". This is illustrated in FIG. 3.

In surface-based "ducting", that is to say where an electromagnetic beam is trapped in a "temperature inversion" layer near the surface of the Earth, the beam will repeatedly reflect from the ground and then from the "temperature inversion" layer. This will cause return echoes every time the beam reflects from the ground.

The net effect of any of these anomalous propagation conditions on the performance of the Radar is that signals received at the antenna, which could normally be assumed to be returns or reflections from an object at a certain range, could actually be reflections from an object positioned significantly further away and possibly even below the usual Radar horizon. Such returns are termed anomalous targets or clutter, are range ambiguous, and can interfere with the normal processing of received signal, meaning that potential targets of interest can be lost amongst the anomalous signals. This can have an adverse effect on the performance of the Radar system and can potentially place it in danger in the event that one of the missed targets is actually a threat.

In a marine setting, where the Radar is installed on a ship, examples of the kind of objects which could cause such returns include land masses or shorelines, oil rigs, aircraft or large slow-moving vessels, such as tankers.

An illustration of the problem is shown in FIGS. 4a and 4b. FIG. 4a shows the magnitude of pulse returns in ten adjacent range cells, for a burst of 8 pulses. Each cross represents a return of a given magnitude. The plurality of diamond shapes positioned approximately between 10 and 20 dB represent the range cell boundaries.

It can be seen that in each range cell, the first 4 returns have a low magnitude—approximately between 0 and 10 dB. The next 4 returns are significantly higher—approximately in the range 30 to 45 dB. In each range cell, the last 4 returns can be attributed to anomalous clutter.

FIG. 4b shows the outputs of the fast channel filter for the corresponding range cells shown in FIG. 4a. The magnitude, after filtering, for most of the range cells is quite high and if any targets were present in the respective range cells, it would be difficult or impossible to identify them amongst that magnitude of clutter. The horizontal line on FIG. 4b at about 14 dB represents the detection threshold. Any returns above this level will be identified as possible targets.

A prior art solution to the problem is to use so-called guard pulses, which are transmitted from the Radar ahead of the normal pulses which are to be processed by the Radar. As in the example discussed above, if anomalous clutter is present in the fifth and subsequent receive periods, then 4 guard pulses can be transmitted ahead of the normal pulses. Any signals received in the first 4 receive periods, corresponding to the guard pulses are effectively ignored and only the subsequent pulses are processed and treated as valid signals. The returns from the anomalous clutter are processed by the receiver using coherent filter processing, which is able to ensure that such returns are effectively discounted.

This is illustrated in more detail in FIGS. 5a and 5b. These figures show the same range cells as are shown in FIGS. 4a and 4b but, in this case, 4 guard pulses have been transmitted in advance of the 8 pulses which are represented. The returns from the 4 guard pulses are not shown, since the returns from these are not processed and are effectively ignored. Now, all the returns from the last 8 pulses that are transmitted in the burst of 12 pulses include returns from the anomalous clutter. All the returns are of approximately equal magnitude in each given range cell.

Now that all the clutter information is available, the coherent filters are much better able to filter out the anomalous clutter resulting in far lower outputs than are shown in FIG. 4b, where guard pulses are not transmitted. This is illustrated in FIG. 5b which shows the output from the fast channel filter after the pulse synthesising algorithm has been applied. The effect of this is that any real targets located in the range cells in question are far more likely to be properly identified and processed accordingly, as they will not be swamped beneath the clutter signals Even though the use of guard pulses is effective in dealing with anomalous clutter, the transmission of extra guard pulses wastes valuable Radar time which, in the case of a Multi-function Radar (MFR), could be better used performing other tasks. In this way, the overall performance of the radar system can be adversely affected.

It is an aim of embodiments of the present invention to address shortcomings in the operation of Radar systems in anomalous propagation conditions, whether mentioned herein or not.

SUMMARY OF THE INVENTION

According to the present invention there is provided a method of mitigating the effects of anomalous propagation in a Radar system, comprising the steps of: receiving a plurality of returns from a plurality of transmit pulses; calculating a difference in magnitude between each of the plurality of returns and its successor; if one of the calculated differences indicates a first step change greater than a first predetermined threshold, calculating a first average magnitude of the returns received after the first step change, and replacing the returns received before the first step change with synthesised returns having a magnitude equal to the first calculated average magnitude.

Preferably, if there is a second step change greater than a second predetermined threshold, after the first step change, then a second average magnitude of the returns received after the second step change is calculated and the returns received before the first step change are instead replaced with synthesised returns having the second calculated average magnitude Preferable, the method of the first aspect further comprises the steps of: determining a phase value for each of the plurality of returns; determining a trend of phase values of returns following the first step change; and replacing phase values of returns before the first step change by extrapolating the trend.

According another aspect of the present invention, there is provided a Radar system, comprising an anomalous propagation processing unit, the anomalous propagation processing unit comprising: a pulse comparator unit operable to receive a plurality of returns from a Radar receiver and to compare a magnitude of each of the plurality of returns with its successor, and to determine if there is a first step change above a first predetermined threshold; a pulse magnitude unit operable to calculate a first average magnitude of returns following the first step change; a pulse phase unit operable to determine a trend in the phase values of returns following the first step change; and a pulse synthesis unit operable to synthesise returns before the first step change, using the calculated average magnitude and phase values according to the determined trend.

Preferably, the pulse comparator unit is further operable to determine if there is a second step change above a second predetermined threshold.

Preferably, the pulse magnitude unit is operable to calculate a second average magnitude of returns following the second step change.

Preferably, the pulse synthesis unit is operable to synthesise pulses having a magnitude equal to the second average magnitude.

According to a still further aspect of the present invention there is provided a tangible, non-transient computer-readable storage medium having instructions which, when executed, cause a computer device to perform the method of the first aspect.

BRIEF DESCRIPTION OF THE FIGURES

For a better understanding of the invention, and to show how embodiments of the same may be carried into effect, reference will now be made, by way of example, to the accompanying diagrammatic drawings in which:

FIGS. 4a and 4b show return signals for a plurality of range cells in the presence of anomalous clutter;

FIGS. 5a and 5b show return signals in the presence of anomalous clutter and the effects of using guard pulses;

DETAILED DESCRIPTION OF PREFERRED EMBODIMENT

Embodiments of the present invention start with the problem set out above but aim to address it without the need to use guard pulses which adversely impact the performance of the Radar. Instead, embodiments of the present invention seek to synthesise returns which include details of the anomalous clutter without the need to waste Radar time transmitting guard pulses.

A method according to an embodiment of the present invention processes the returns from a plurality of pulses included in a burst, without the need the need to transmit guard pulses. The early returns within the burst which do inherently include signals received from anomalous clutter are synthesised, based on the later returns within the burst which do include signals received from the anomalous clutter. The intention is to provide the coherent receive filters with sufficient information on the anomalous clutter for them to be able to process the returns in a manner which allows the presence of the anomalous clutter to be discounted in subsequent processing.

The method includes a step of examining the received pulses in an attempt to locate one or more step increases in magnitude (i.e. increases above a first predefined threshold) between successive receive pulses. The first pulse is located and its magnitude is compared to the second pulse, the second pulse is compared to the third and so on, until the penultimate pulse is compared with the ultimate pulse. This process is repeated for each range cell.

When a step increase above the first predefined threshold is encountered, this may indicate the presence of anomalous propagation conditions and that anomalous clutter is being detected. The task of seeking out further step changes is continued, since there can be more than one return received due to anomalous clutter located at different distances, but which is received in the same range cell, due to its inherently range ambiguous nature. A different threshold may be defined for second and subsequent step changes.

Having identified one or more step changes, the next step involves taking an average magnitude for the pulses attributable to the farthest clutter source.

This average magnitude is used to synthesise earlier pulse returns, which do not include any information on the anomalous clutter. In effect, the earlier returns, before any step increase, are replaced with synthesised returns which have a magnitude equal to the calculated average magnitude.

Figure 1:
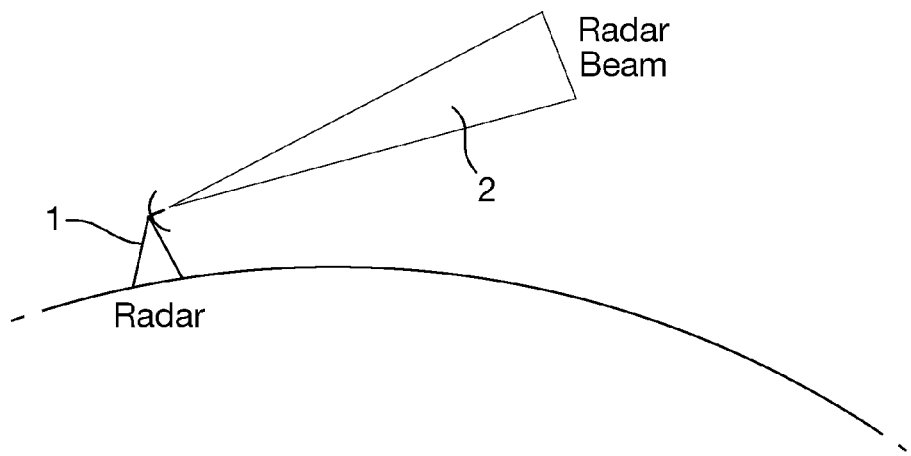
FIG. 1 shows a representation of normal propagation conditions.
Figure 2:
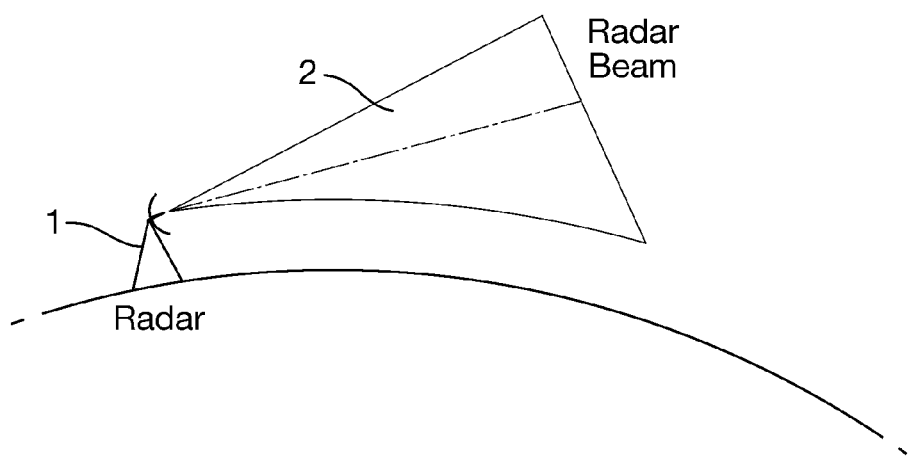
FIG. 2 shows a representation of anomalous propagation conditions, caused by a temperature inversion.
Figure 3:
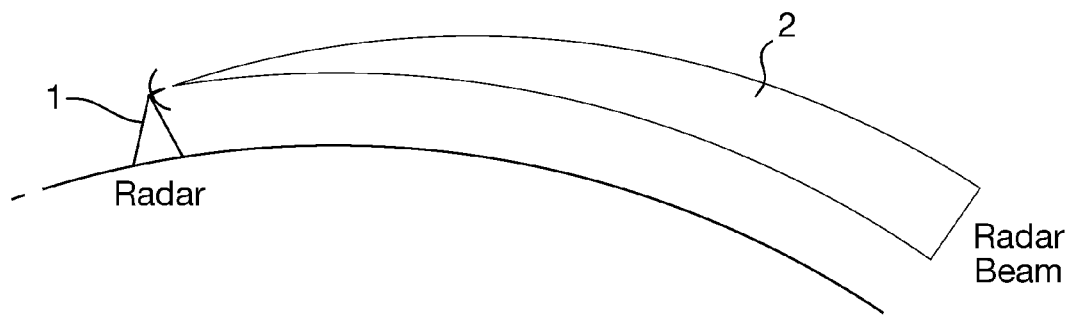
FIG. 3 shows a representation of "ducting"
Figure 6A:
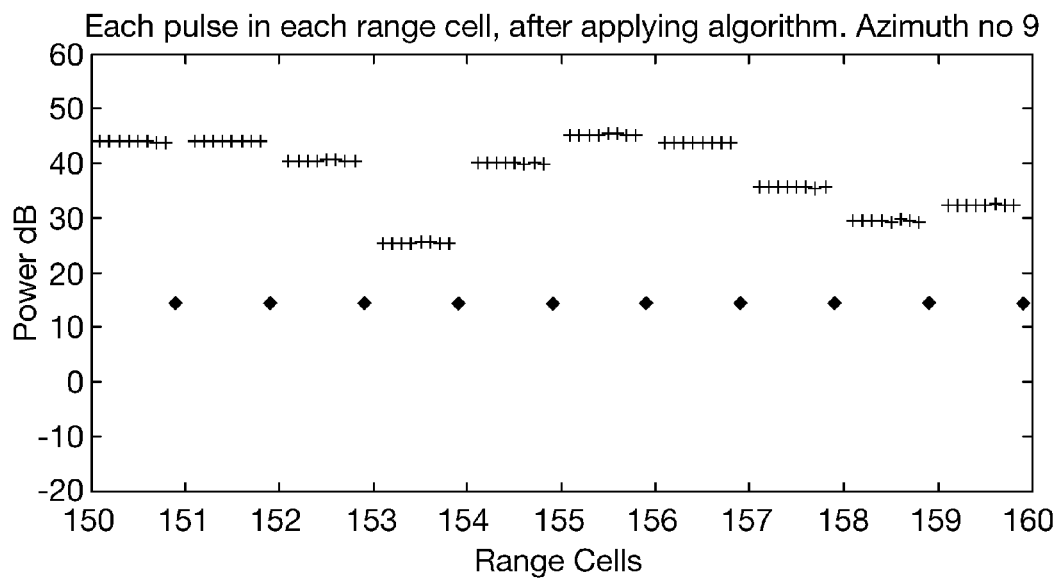
FIGS. 6a and 6b show return signals in the presence of anomalous clutter in a system according to an embodiment of the present invention.
Figure 6B:
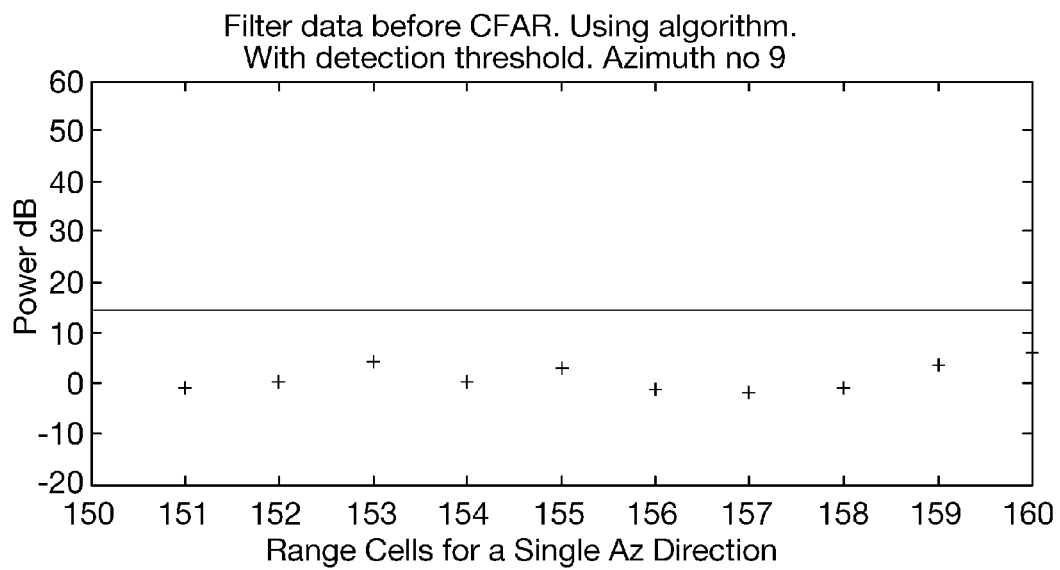

The effects of this can be seen in FIGS. 6a and 6b. FIG. 6a shows the result of replacing the first 4 pulse returns in each range cell, as shown in FIG. 4a, with synthesised returns equal to the average magnitude of the later pulse returns, which are associated with anomalous clutter. As such, the first 4 pulse returns are of equal magnitude, and that magnitude is the average of the last 4 returns in each range cell.

FIG. 6b shows the output of the coherent filters, and the resultant outputs are broadly in line with those shown in FIG. 5b, where guard pulses were transmitted. The magnitude of the filtered outputs is such that any targets have a much better chance of being detected amongst the anomalous clutter.

Of course, in practice, the step increase between the non-anomalous clutter returns and the anomalous clutter returns can occur at any point in the burst of pulses, and the example shown here, where it occurs between the fourth and fifth returns is exemplary only.

The foregoing describes the method by which the magnitudes of returned pulses are processed according to an embodiment of the present invention. However, there is another parameter connected with returned signals which is also processed. Each received pulse signal has a magnitude component and also a phase component. The phase component can be analysed to reveal information about the radial velocity of a target. As such, this information should be preserved, or re-created, insofar as this is possible.

Figure 7A:
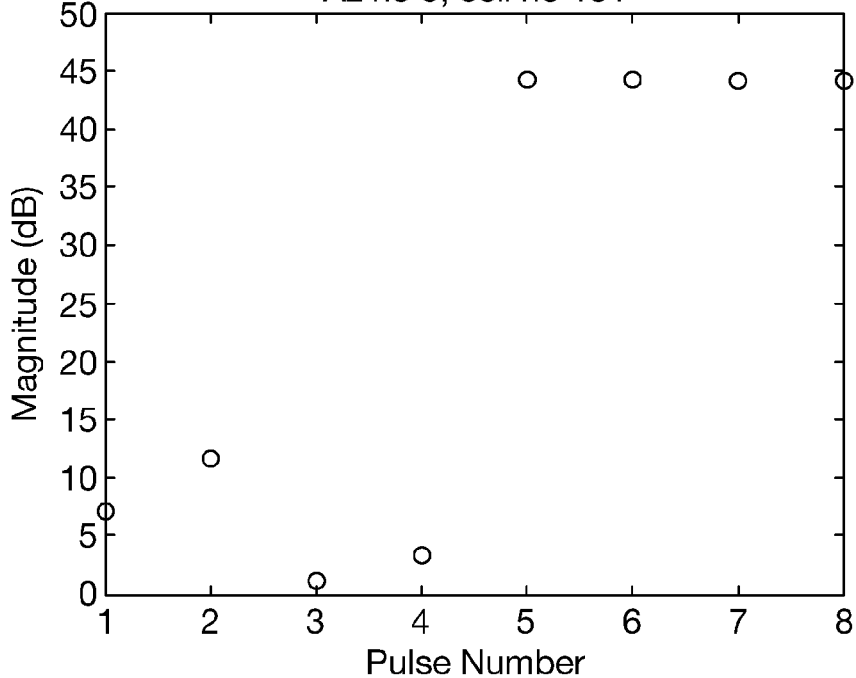
FIGS. 7a and 7b show raw magnitude and phase returns for a particular range cell.
Figure 7B:
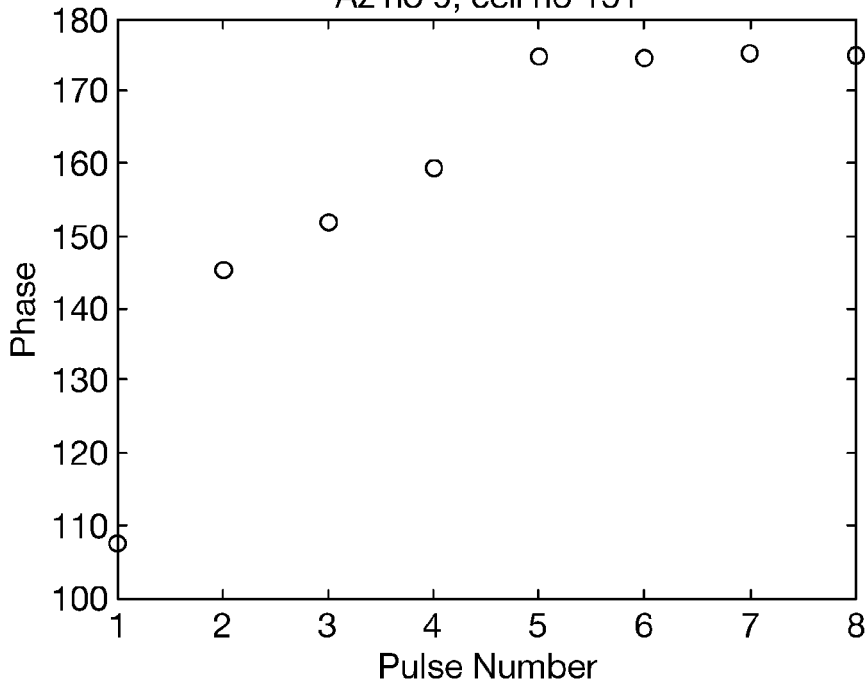

In the case of stationary clutter, the phase difference between successive receive pulses will be substantially zero. This is illustrated in FIGS. 7a and 7b. FIG. 7a shows a more detailed view of the magnitude returns from range cell 151, originally shown in FIG. 4a. FIG. 7b shows the corresponding phase values for the same pulses. FIG. 7a shows the step change in magnitude values which is used to determine anomalous propagation conditions exist. The average magnitude of pulses 5-8 is used to synthesise the values of pulses 1-4 as set out previously. In a similar way, any difference in phase between pulses 5 and 8 will be used to determine an average phase change between successive pulse returns. This determined average phase change is then used to synthesise the phase values of pulse returns 1 to 4.

Figure 8A:
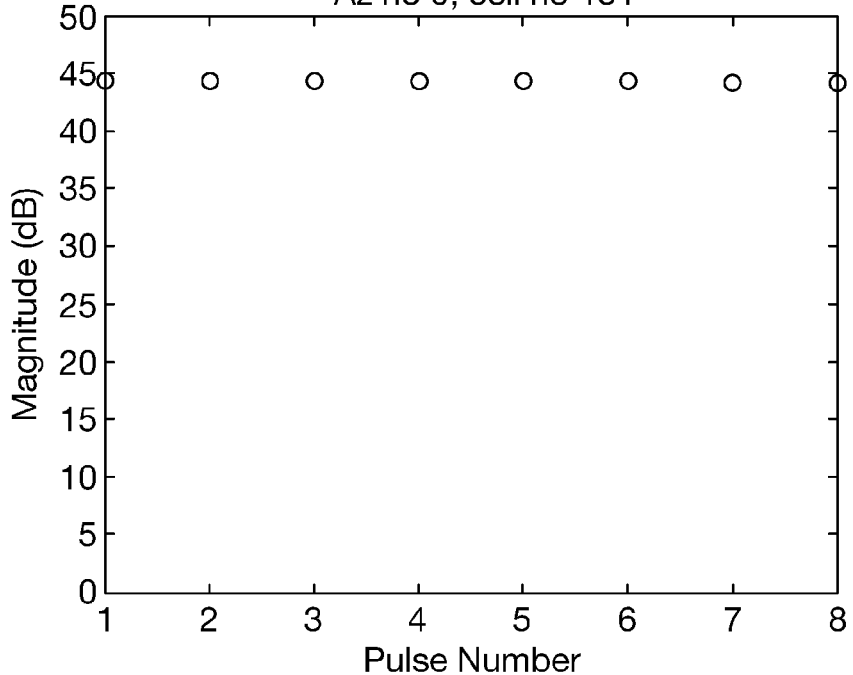
FIGS. 8a and 8b show synthesised magnitude phase returns after processing according to an embodiment of the present invention.
Figure 8B:
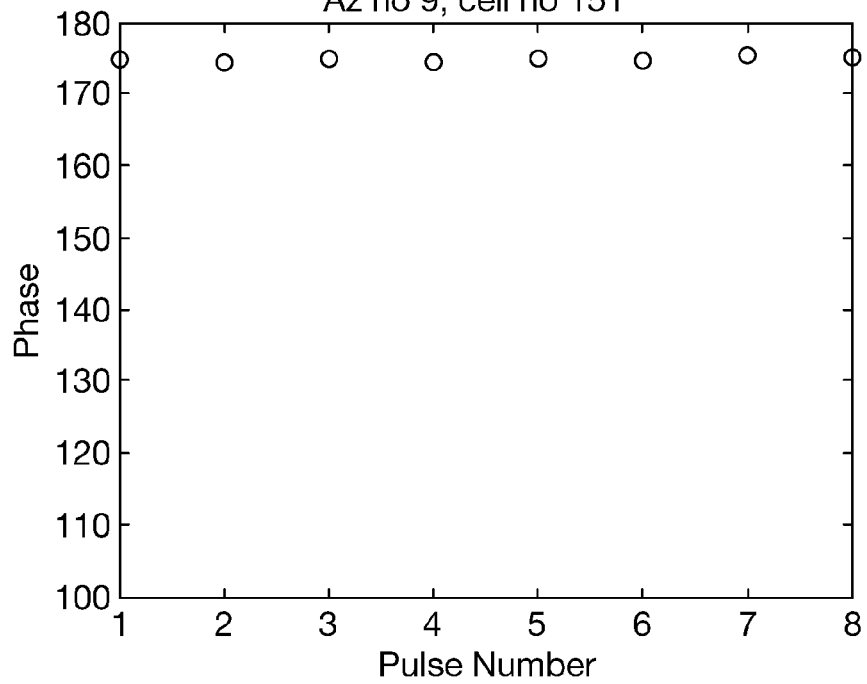

FIGS. 8a and 8b show, respectively, the processed magnitude and phase values, after the magnitude and phase values of pulses 1 to 4 have been synthesised, as set out. FIG. 8a shows that the synthesised magnitudes of pulses 1 to 4 are identical and are equal to the average magnitude of pulses 5 to 8. FIG. 8b shows how the phase values of pulses 1 to 4 are synthesised, based upon the phase values of pulses 5 to 8. In particular, there is a very slight perturbation in the phase values of pulses 5 to 8 which has been preserved in the phase values of pulses 1 to 4. Unlike the synthesised magnitude values, which are all identical, the phase values are more subtle and any trend apparent in, in this example, pulse 5 to 8, is replicated in the synthesised phase values.

Figure 9A:
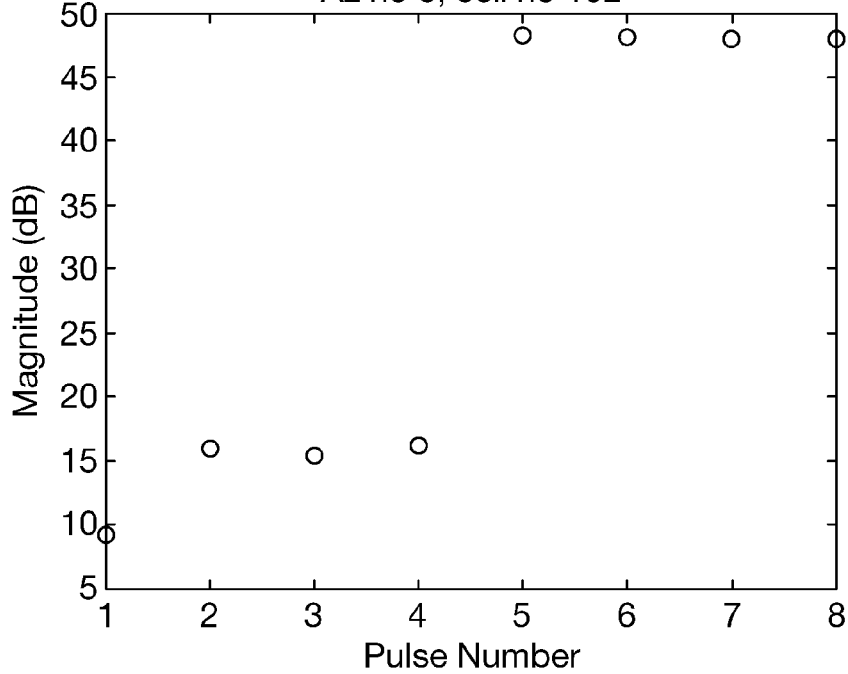
FIGS. 9a and 9b raw magnitude and phase returns for a particular range cell in the case of moving anomalous clutter.
Figure 9B:
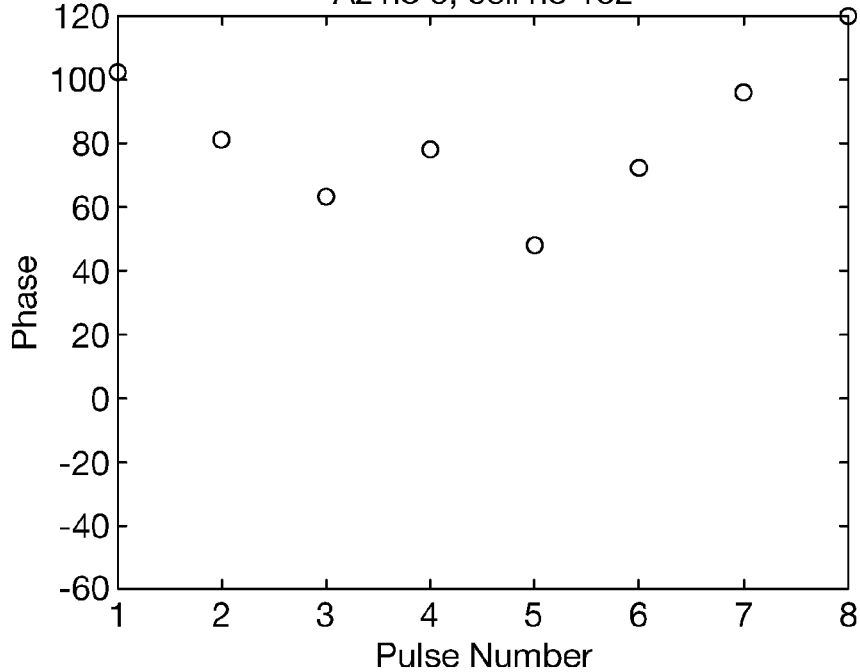

FIGS. 9a and 9b relate to the scenario where there is a distinct phase change between successive pulses received from anomalous clutter targets. FIG. 9a shows the raw magnitude values, which are processed as before to determine the point at which anomalous clutter is detected. This corresponds to the step change between pulses 4 and 5. The magnitudes of pulses 1 to 4 are then synthesised, as previously set out.

However, in this case, the phase values of pulses 5 to 8 are not constant and follow a clearly defined trend, whereby there is a phase difference in the range of approximately 25-30° between successive pulses. The average phase difference between pulses 5 to 8 is determined and extrapolated to synthesise pulse returns for pulses 1 to 4.

Figure 10A:
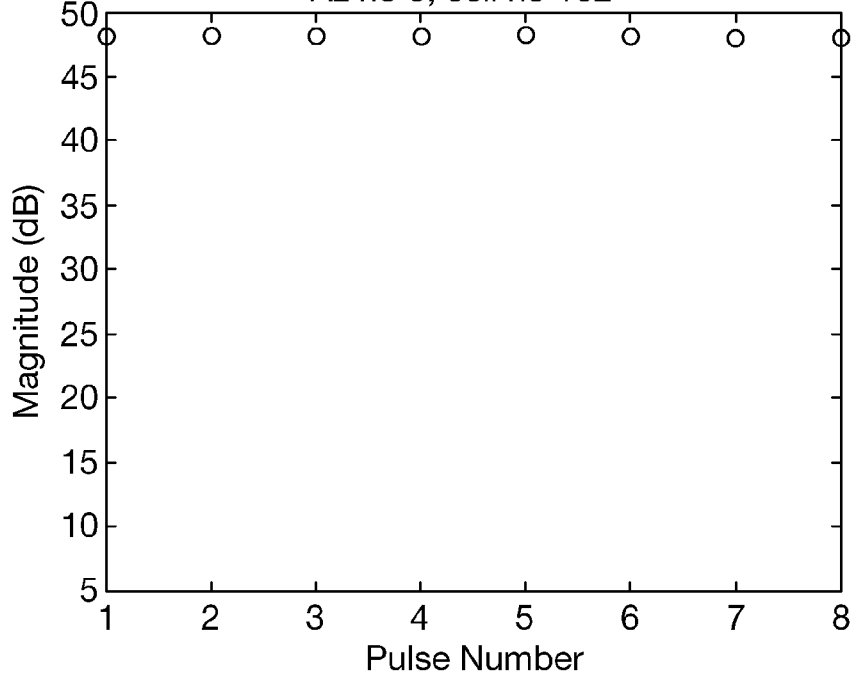
FIGS. 10a and 10b show magnitude and phase returns after processing according to an embodiment of the present invention.
Figure 10B:
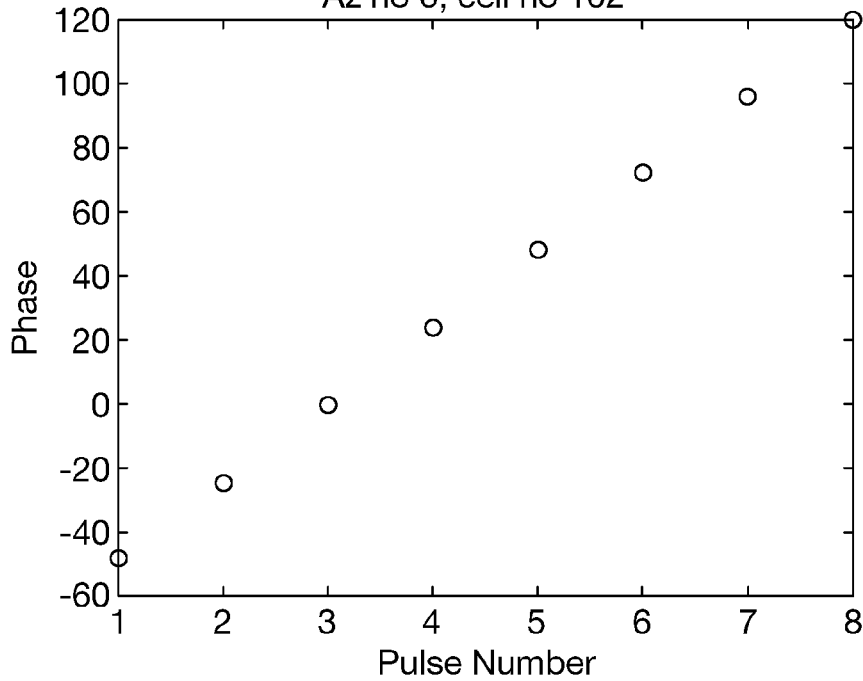

The results of the magnitude and phase processing are shown in FIGS. 10a and 10b respectively, where FIG. 10a shows pulses 1 to 4 having a magnitude equal to the average magnitude of pulses 5 to 8, as set out previously. FIG. 10b shows that the phase values of pulses 1 to 4 have been synthesised to conform to the trend identified in pulses 5 to 8.

By synthesising the phases in this way, the range rate of the radar return is correctly positioned in the Doppler domain and the subsequent Doppler processing deals with it correctly.

Figure 11:
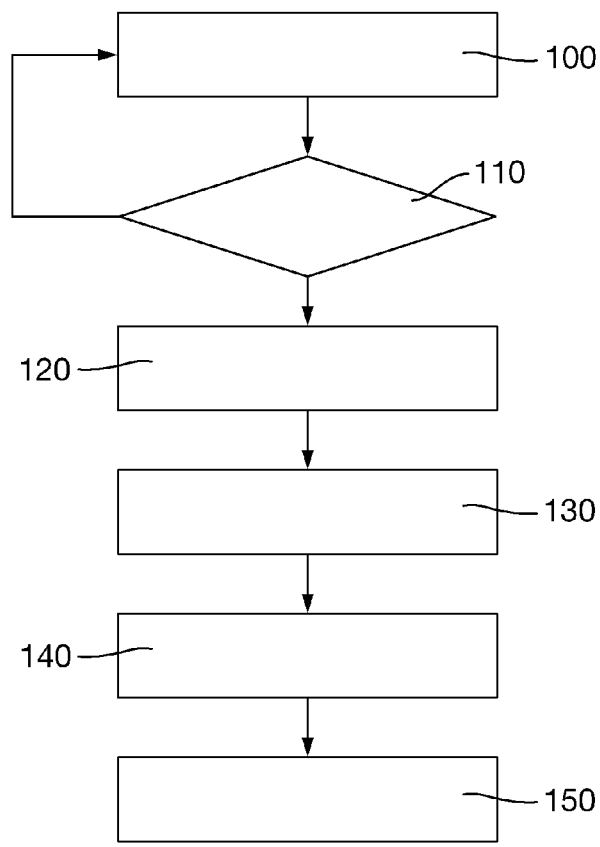
FIG. 11 shows a flowchart of a method according to an embodiment of the present invention.

FIG. 11 shows a flowchart which summarises the method according to an embodiment of the present invention. At step 100, return pulses are received. At step 110, each return pulse is compared to its predecessor. If there is no step change above a predefined threshold, then step 100 is repeated. If there is a step change above the predefined threshold, then the remaining return pulses following it are read until the last pulse in the present burst has been read. At step 120, the average magnitude of the return pulses following the step change is calculated.

At step 130 the pulses preceding the step change are synthesised and set to equal the average magnitude calculated at step 120.

At step 140, the phase difference between successive pulse returns following the step change is determined.

At step 150, the phase values of the pulse returns preceding the step change are synthesised according to the determination made at step 140.

The steps of the method are repeated for each burst, which consists of a given number of pulses.

In order to perform the method of the operation, specialised processing apparatus may be provided. Alternatively, general purpose processing apparatus, suitably programmed to perform the method of embodiments of the invention, may be provided.

Figure 12:
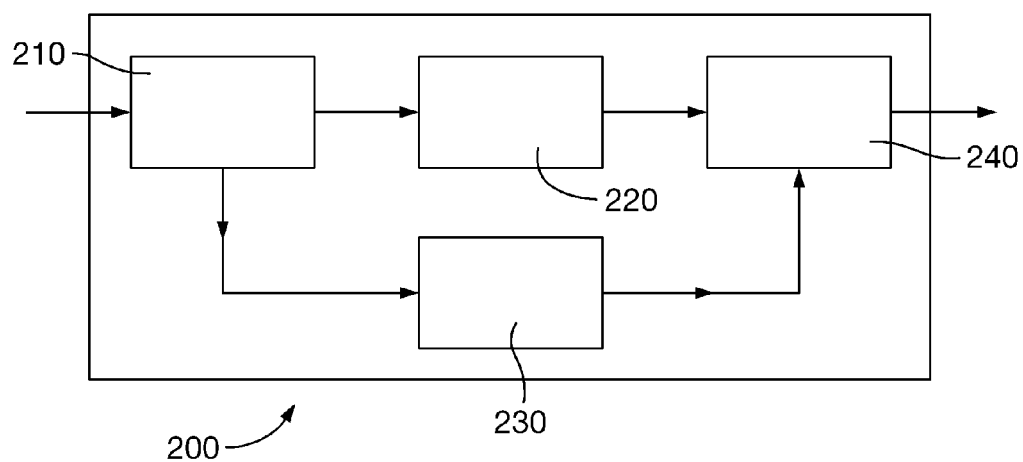
FIG. 12 shows a schematic of an anomalous propagation processor according to an embodiment of the present invention.

In an embodiment of the present invention, there is provided an anomalous propagation processor unit 200, shown in FIG. 12. The unit receives return pulses from the Radar receiver. These are fed into a pulse comparator unit 210, which is operable to compare the magnitude of each pulse with its successor, as described previously. The pulse comparator unit 210 is also operable to identify a step change above a predefined threshold.

Pulses from pulse comparator unit 210 are then passed to Pulse magnitude unit 220 which is operable to calculate an average magnitude of pulses following the step change, and also to Pulse phase unit 230, which is operable to determine a trend in the phase values following the step change and to extrapolate that trend back, so that pulse phase values before the step change can be synthesised according to the trend.

Finally, the outputs of units 220 and 230 are passed to pulse synthesis unit 240, which is operable to synthesise returns before the step change, using the magnitude and phase figures derived in the previous units.

The output from the unit 200 then feeds into the regular coherent processing system of the Radar system in the usual way.

As can be seen from the foregoing, embodiments of the present invention allow for better processing of clutter returns, received due to anomalous propagation conditions and obviate the need for the Radar to spend valuable time transmitting guard pulses.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of mitigating the effects of anomalous propagation in a Radar system, the method comprising:
    receiving a plurality of returns from a plurality of transmit pulses;
    calculating a difference in magnitude between each of the plurality of returns and its successor; and
    if one of the calculated differences indicates a first step change greater than a first predetermined threshold, calculating a first average magnitude of the returns received after the first step change, and replacing the returns received before the first step change with synthesized returns having a magnitude equal to the first calculated average magnitude.

2. The method of claim 1, wherein if there is a second step change greater than a second predetermined threshold, after the first step change, calculating a second average magnitude of the returns received after the second step change and replacing the returns received before the first step change with synthesized returns having the second calculated average magnitude.

3. The method of claim 1 further comprising:
    determining a phase value for each of the plurality of returns;
    determining a trend of phase values of returns following the first step change; and
    replacing phase values of returns before the first step change by extrapolating the trend.

4. A Radar system, comprising an anomalous propagation processing unit, the anomalous propagation processing unit comprising:
    a pulse comparator unit operable to receive a plurality of returns from a Radar receiver and to compare a magnitude of each of the plurality of returns with its successor, and to determine if there is a first step change above a first predetermined threshold;
    a pulse magnitude unit operable to calculate a first average magnitude of returns following the first step change;
    a pulse phase unit operable to determine a trend in the phase values of returns following the first step change; and
    a pulse synthesis unit operable to synthesize returns before the first step change, using the calculated average magnitude and phase values according to the determined trend.

5. The Radar system according to claim 4 wherein the pulse comparator unit is further operable to determine if there is a second step change above a second predetermined threshold.

6. The Radar system of claim 5 wherein the pulse magnitude unit is further operable to calculate a second average magnitude of returns following the second step change.

7. The Radar system according to claim 6 wherein the pulse synthesis unit is further operable to synthesize pulses having a magnitude equal to the second average magnitude.

8. A non-transitory computer-readable storage medium having instructions encoded thereon which, when executed by one or more processors, cause a process to be carried out for mitigating the effects of anomalous propagation in a Radar system, the process comprising:
    receiving a plurality of returns from a plurality of transmit pulses;

calculating a difference in magnitude between each of the plurality of returns and its successor; and if one of the calculated differences indicates a first step change greater than a first predetermined threshold, calculating a first average magnitude of the returns received after the first step change, and replacing the returns received before the first step change with synthesized returns having a magnitude equal to the first calculated average magnitude.

9. The computer-readable storage medium of claim 8, wherein if there is a second step change greater than a second predetermined threshold, after the first step change, the process further includes calculating a second average magnitude of the returns received after the second step change and replacing the returns received before the first step change with synthesized returns having the second calculated average magnitude.

10. The computer-readable storage medium of claim 9, the process further comprising:

determining a phase value for each of the plurality of returns;

determining a trend of phase values of returns following the first step change; and replacing phase values of returns before the first step change by extrapolating the trend.

11. The computer-readable storage medium of claim 8, the process further comprising:

determining a phase value for each of the plurality of returns;

determining a trend of phase values of returns following the first step change; and replacing phase values of returns before the first step change by extrapolating the trend.

12. The method of claim 2, further comprising:

determining a phase value for each of the plurality of returns;

determining a trend of phase values of returns following the first step change; and replacing phase values of returns before the first step change by extrapolating the trend.

* * * * *